Aug. 4, 1953  F. W. EXTON  2,647,768
TANK FILL CONNECTION
Filed May 19, 1949
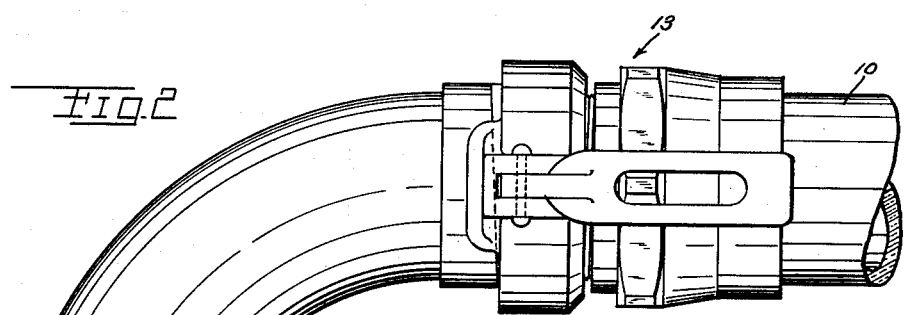
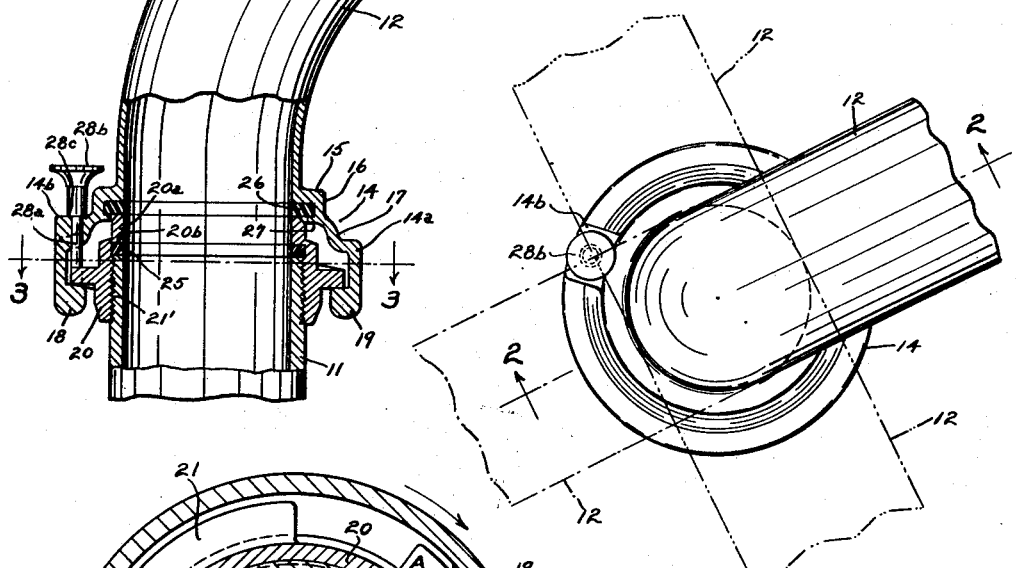
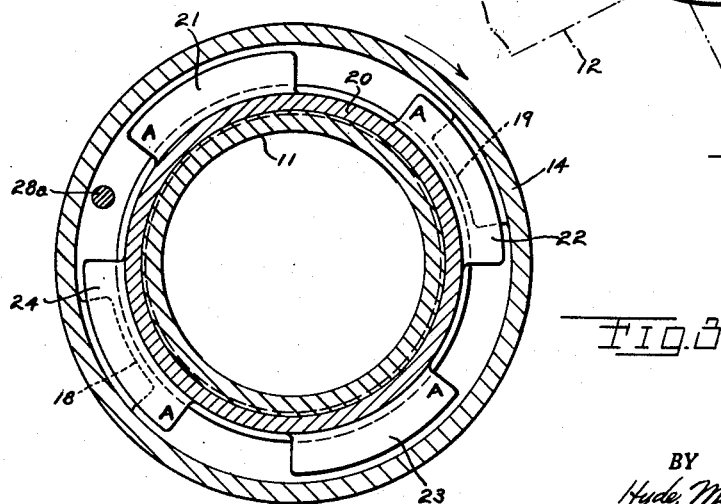
INVENTOR.
FRED W. EXTON
BY
Hyde, Meyer, Baldwin & Doran
ATTORNEYS Patented Aug. 4, 1953

2,647,768

UNITED STATES PATENT OFFICE 2,647,768

TANK FILL CONNECTION

Fred W. Exton, Cleveland, Ohio, assignor to The Cleveland Brass Manufacturing Company, Cleveland, Ohio, a corporation of Ohio Application May 19, 1949, Serial No. 94,080

1 Claim. (Cl. 285—107)

This invention relates to improvements in a tank fill connection and more particularly to means for providing a tight connection between a filling elbow and a pipe leading to a tank to be filled.

One of the objects of the present invention is provide novel connections on the tank fill pipe and on the pipe connected thereto whereby the connection may be made so as to be oriented in any one of four different directions.

Another object of the invention is to provide a tight fill connection which is adapted to be tightened by using the elbow of the connecting pipe as a lever whereby very efficient connection is made.

Still another object of the present invention is to provide a tank filling connection of the type described wherein apparatus is provided so that the connection cannot be accidentally broken while the filling operation is going on.

Other objects and advantages of the invention will be apparent from the accompanying drawings and description and the essential features will be set forth in the appended claim.

In the drawings,

Fig. 1 is a fragmental top plan view of my improved connection shown in full lines with alternative positions shown in broken lines of three different characters;

Fig. 2 is a sectional view of the same taken along the line 2—2 of Fig. 1; while Fig. 3 is a sectional view enlarged taken along the line 3—3 of Fig. 2.

In filling tank reservoirs from transportation tanks with oil products, there is always danger that the connection may come loose while the transfer of oil products is being made, resulting in the overflow of oil products with a fire hazard if nothing else. In addition to this, where gasoline is transferred, there is a danger from leakage fumes. An object of the present invention is to correct this matter by providing a tight coupling. An instance of the use of such a coupling is the transfer of gasoline or the like from a tank wagon to a reservoir tank buried in the ground and having a fill pipe extending vertically to a point above the ground or accessible from ground level. Other uses of my invention will occur to those familiar with the industry.

Referring first to Fig. 2, I have shown a flexible hose 10 which may lead from a tank wagon or the like for the transfer of oil or gasoline to a tank buried under ground and communicating with a vertical pipe 11 which extends to a point accessible from ground level or thereabouts. My invention includes the use of an elbow 12 which may be of the character shown or of any other well known elbow characteristics or equivalent thereof. This elbow may be permanently attached to the hose 10 or may be adapted to be quickly coupled and uncoupled as shown in the drawings used to illustrate my invention, in which case, the elbow 12 may be carried in the box at the rear of the tank wagon rather than remaining connected to the hose. The connection here shown at 13 is similar to the quick detachable coupling shown and claimed in the United States Patent No. 2,042,125 granted May 26, 1936 to Nathan Roach, to which reference may be had for a more complete description. It has no part to play in the present invention except to indicate one manner of connecting the hose 10 to the elbow 12.

A clamping ring 14 is secured to the lower end of the elbow 12. In the drawing of Fig. 2, this clamping ring is shown integrally attached to the elbow 12 as by welding. It is obvious that the invention might be carried out by having the clamping ring 14 threaded or otherwise rigidly attached to the elbow 12 in a fluid tight manner. Beginning at the elbow 12, the clamping ring 14 is first provided with a radially outwardly extending shoulder 15 after which there is a short downwardly extending cylindrical portion 16 following which is an outwardly flaring portion 17 which terminates in the ring proper 14a. Depending from this ring 14a on diametrically opposite sides thereof are two lugs 18 and 19, each of which extends first downwardly and then radially inwardly so as to underlie the locking lugs on an adaptor ring 20. This adaptor ring is shown as having a threaded connection 21 with the fill pipe 11 but obviously the specific type of attaching means is not pertinent to the present invention. Extending radially outwardly from the adaptor ring 20, are four locking lugs 21, 22, 23 and 24. These lugs are positioned ninety degrees apart around the adaptor 20. Preferably, the locking lugs 21 to 24 inclusive on the adaptor are slightly wider in circumferential extent than the lugs 18 and 19 on the locking ring. Necessarily, for the bayonet joint connection, the lugs 18 and 19 must fit circumferentially between any two of the adjacent lugs 21, 22, 23 and 24. As indicated in Fig. 3, the end marked A on each of the adaptor lugs is higher with reference to ground level and each of these lugs then slopes downwardly in a clockwise direction as viewed in Fig. 3. It results from this construction that if the elbow 12 is positioned above the adaptor 20 with the lug 18 between lugs 23 and 24 and the lug 19 between lugs 21 and 22 as viewed in Fig. 3, then when the elbow 12 and locking ring 14 is turned in the direction of the arrow of Fig. 3, the lug 19 will engage lug 22 and the lug 18 will engage lug 24 and the lock ring 15 will be cammed downwardly toward the adaptor 20.

Means is provided for sealing the joint between the elbow 12 and the fill pipe 11 in a fluid tight manner when the parts are placed together and clamped together as indicated in the preceding paragraph. To this end, the adaptor 20 has a converging neck 20a at its uppermost end which provides a shoulder 20b overlying the upper end of the pipe 11. Between the shoulder 20b and the end of pipe 11, there is provided a sealing gasket 25. The adaptor 20 is drawn down tightly on the threads 21' so as to provide a tight seal between it and the end of pipe 11, closed by the gasket or sealing ring 25. In the shoulder of the elbow 12 provided by the portions 15 and 16 of the clamping ring, there is seated an annular gasket or sealing ring 26. A short flange 27 extending radially inwardly beneath the sealing ring 26 may be provided to hold it firmly in place. This positions the sealing ring 26 opposite the end of the neck 20a on the adaptor so that when the clamping ring 14 is pulled down tightly by the lugs 18 and 19, as previously described, the sealing ring 26 will be pressed tightly against the end of the adaptor at 20a making a fluid tight connection at this point. The portions 15 and 16 of the clamping ring are uninterrupted and imperforate so as to make a fluid tight joint at every point. It will be noted that the inner walls of the elbow 12, the sealing ring 26, the neck 20a, the sealing ring 25 and the interior wall of fill pipe 11 are preferably smoothly aligned for even flow of liquid.

Means is provided to insure that the connection will not be accidentally broken while a filling operation is going on. To this end, a lug 14b integral with the clamping ring 14 extends radially outwardly therefrom at one point. Through a vertically extending hole in the lug 14b, there passes the cylindrical portion 28a of a pin 28b which is carried at all times in the lug 14b. A shoulder 28c on the pin engages the top of lug 14b to limit downward movement of the pin. Referring to Fig. 3, it will be noted that if the lugs 18 and 19 tend to move in a counterclockwise direction, due to vibration or to a striking of the fill connection accidentally, the pin 28b, carried by the clamping ring 14, will strike the lug 24 before the connection can fall apart. This is a valuable feature as it prevents a breaking of the connection and a spilling of the liquid through an accidental breaking of the connection.

Referring to Figs. 1 and 3, it will be obvious that while I have shown in full lines the elbow 12 extending in one direction from the fill pipe, it would be possible to enter the lugs 18 and 19 in four different positions with reference to the lugs 21, 22, 23 and 24, so as to place the elbow 12 in any of the other three positions of Fig. 1 indicated in broken lines. This is a valuable feature of my invention as it prevents any great distortion of the hose 10 and the fill connection, such as would occur if it were possible to connect the elbow 12 extending in one direction only from the fill pipe 11. The driver cannot control the direction in which he approaches the fill box, and must connect the hose 10 in any position in which he finds himself.

The manner of use of my invention should now be obvious. The driver of the transportation vehicle, backs the same up to the fill pipe 11 in any position which he finds necessary. If the elbow 12 or similar angle connection is not already connected to the pipe 10, the operator connects the elbow 12 to the pipe 10 using a quick acting coupling such as that shown at 13. Before connecting this coupling, the operator places the elbow 12 with its clamping ring 14 in a suitable position on the adaptor 20, placing the lugs 18 and 19 between whichever sets of lugs, 21 to 24 inclusive, forms the most natural position. Using the elbow 12 as a lever, the operator then turns the clamping ring 14 in a clockwise direction as viewed in Fig. 3, causing the lugs 18 and 19 to cam the ring 14 down tightly against the adaptor 20. In this process, the sealing ring 26 is tightly clamped in sealing position. It will be noted that the camming action of a pair of the lugs 21 to 24 inclusive upon the lugs 18 and 19 is effective to tighten the joint when the elbow 12 is turned through less than the angular extent of any one of the lugs 21 to 24 inclusive. The pin 28a is loosely carried by the elbow member fitting at a point spaced circumferentially from the mid-portion of one of the two elbow member lugs, 18 or 19, by an amount of approximately 45 degrees. It results from this construction that when the two elbow member lugs 18 and 19 are entered between any pair of the four fill pipe member lugs 21 to 24 inclusive, the pin 28a will be pushed upwardly by and will ride upon one of this set of four lugs. Then, after joint tightening rotation of the elbow member 12, the pin 28a will ride off of the lug which it is riding upon, and will drop by gravity downwardly between the lugs of the fill pipe member so as to prevent reverse rotation of the elbow member sufficiently to disengage the bayonet joint. Both hands of the operator are thus available for handling the elbow member 12 and the attached hose 10 and coupling 13. The pin 28b drops into its locking position automatically. The driver then secures the connection 13 so that the hose 10 is coupled to the elbow 12. The filling operation may then proceed without any danger of the escape of the contents in an undesirable manner. Using the elbow 12 as a lever, an operator or ordinary strength may pull this coupling down so tightly that even gasoline fumes will not escape into the surrounding atmosphere so long as the coupling remains in its clamped position. In any case, even if the coupling becomes slightly loose, the liquid itself cannot be spilled because of the locking pin 28b.

What I claim is:

A tank fill connection between a fill pipe member and an elbow member comprising coacting bayonet joint fittings on the meeting ends of said members including four out-turned radially extending lugs on said fill pipe member spaced 90 degrees apart, two inturned radially extending lugs on said elbow member spaced 180 degrees apart, the lugs on said elbow member being integrally connected therewith, said four lugs on said fill pipe member having circumferentially extending spaces between them wider than the circumferential extent of each of said two lugs on said elbow member whereby said two lugs may pass downwardly through the spaces between said four lugs, said fittings making a fluid tight connection between said members, a sealing gasket between said fittings, said four lugs being all inclined in the same direction circumferentially to cam said elbow member fitting downwardly and to pull said fittings together in joint tightening manner by rotation of said elbow member fitting through less than the angular extent of one of said set of four lugs, whereby the elbow member serves as a lever for its rotation, a pin loosely carried by said elbow member fitting at a point spaced circumferentially from the midportion of one of said two elbow-member lugs by an amount of approximately 45 degrees, and stop means on said pin holding the lower end thereof at the level of said four fill-pipe-member lugs, whereby when said two elbow-member lugs are entered between any pair of said four fill-pipe member lugs, said pin will be pushed upward by and ride upon one of said set of four lugs and, after joint tightening rotation of said elbow-member, said pin will ride off of the lug it is riding upon and will drop by gravity downwardly between said lugs of said fill pipe member to prevent reverse rotation of said elbow member sufficient to disengage said bayonet joint.

FRED W. EXTON.

References Cited in the file of this patent

UNITED STATES PATENTS

| Number | Name | Date |
| --- | --- | --- |
| 274,951 | Luther | Apr. 3, 1883 |
| 439,902 | Sharon | Nov. 4, 1890 |
| 788,600 | Rogers | May 2, 1905 |
| 1,022,851 | Knack | Apr. 9, 1912 |
| 1,483,028 | Walsh | Feb. 5, 1924 |
| 1,525,794 | Blake | Feb. 10, 1925 |
| 1,774,179 | MacGregor | Aug. 26, 1930 |
| 2,041,762 | Hazard et al. | May 26, 1936 |
| 2,119,331 | Jensen | May 31, 1938 |
| 2,419,702 | Barnes | Apr. 29, 1947 |

FOREIGN PATENTS

| Number | Country | Date |
| --- | --- | --- |
| 407,455 | Germany | Dec. 22, 1924 |
| 387,628 | Great Britain | Feb. 9, 1933 |
| 612,935 | Germany | May 8, 1935 |